No. 825,970. PATENTED JULY 17, 1906.
L. HOOVER.
APPARATUS FOR BREAKING ANIMALS.
APPLICATION FILED OCT. 2, 1905.
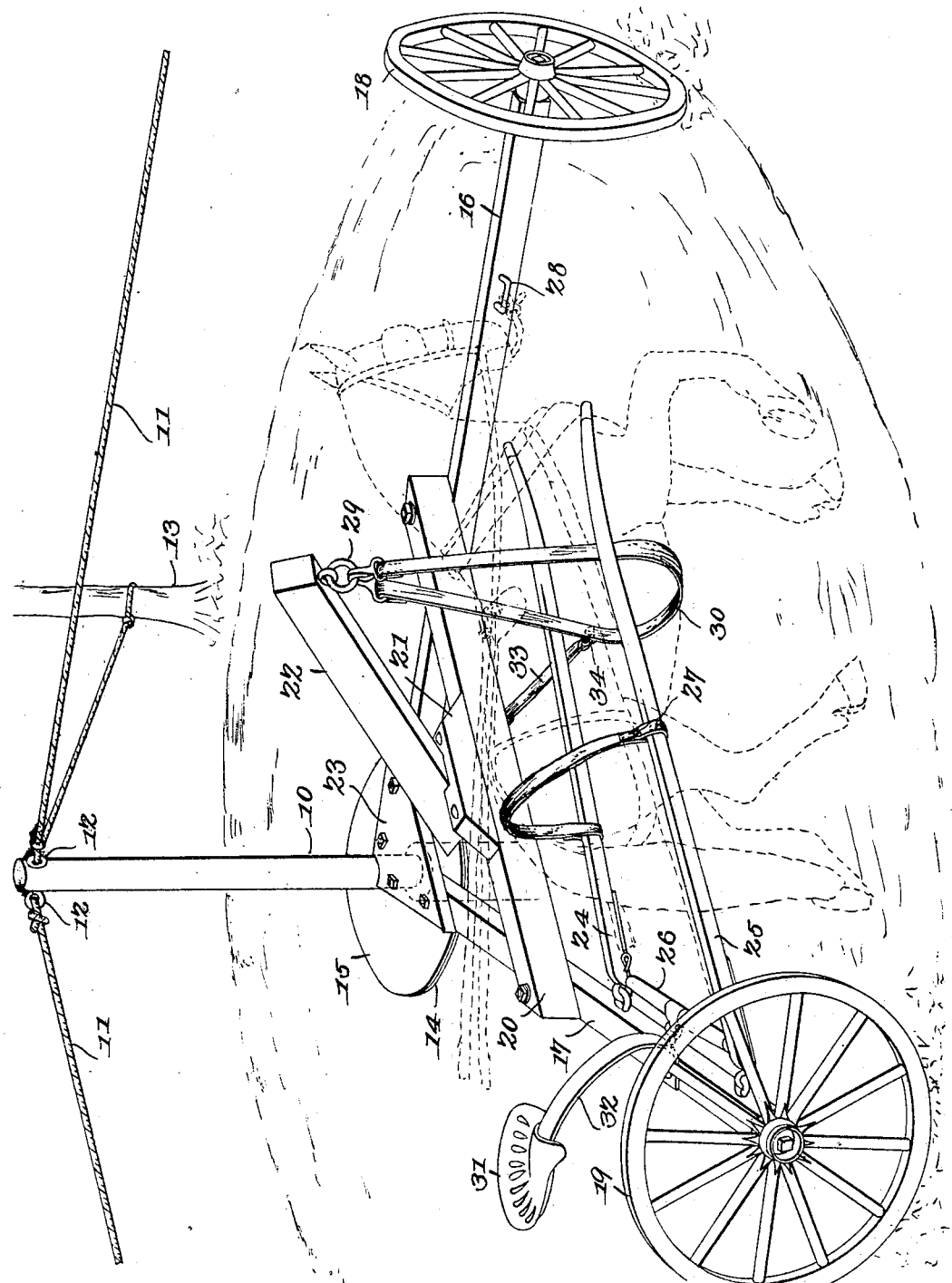
Witnesses
Loren Hoover, Inventor.
by
Attorneys

UNITED STATES PATENT OFFICE.

LOREN HOOVER, OF NARKA, KANSAS.

APPARATUS FOR BREAKING ANIMALS.

No. 825,970.  Specification of Letters Patent.  Patented July 17, 1906.

Application filed October 2, 1905. Serial No. 280,968.

*To all whom it may concern:*

Be it known that I, LOREN HOOVER, a citizen of the United States, residing at Narka, in the county of Republic and State of Kansas, have invented a new and useful Apparatus for Breaking Animals, of which the following is a specification.

This invention relates to apparatus for breaking animals, and more particularly young and fractious horses.

The object of the invention is in a ready and practical manner to permit a horse to run or back, but positively to prevent it from throwing, straining, or otherwise injuring itself or its trainer.

With the above and other objects in view, as will appear as the nature of the invention is better understood, the same consists in the novel construction and combination of parts of an apparatus for breaking animals, as will be hereinafter fully described and claimed.

In the accompanying drawing, forming a part of this specification, the figure is a view in perspective exhibiting an apparatus capable of carrying the present invention into effect.

The apparatus embodies a mast 10, that is set up in the earth and is held against lateral displacement by guy-ropes 11, the terminals of which are secured, respectively, in eyes 12, carried by the mast, and to suitable stationary objects, such as to trees 13, one only of which is shown.

Secured to the mast near its lower end is a circular table 14, which is disposed in a horizontal plane and supports a rotatable table 15, to which are secured the inner ends of radially-disposed sweeps 16 and 17, the outer ends of which are supported by wheels 18 and 19, suitably journaled thereon.

Mounted upon the upper side of the sweeps and attached thereto is a beam 20, having secured adjacent to its center a bearing-block 21, upon which rests the intermediate portion of an inclined boom 22, the inner end of which is secured to the table 15 and is braced against lifting by a cross-piece 23, rigidly combined with the sweeps. To the sweep 17 is attached a pair of ordinary thills 24 and 25, carrying a whiffletree 26 of the usual or any preferred construction. Intermediate of the ends of the thills is secured a strap 27, hereinafter designated a "rump-strap," which is of a length to pass over the rump of the animal and operates positively to prevent kicking, as the animal will be unable to lift his hind quarters. To prevent the animal from rearing, the sweep 16 is provided with a loop or staple to which is secured one end of a halter-strap that is combined with the bridle in any preferred manner, while the sweep 17 carries a driver's seat 18, supported by a spring 32.

The outer end of the boom 22 is provided with a ring 29, with which engage snap-hooks carried by the terminals of a strap 30, hereinafter designated a "girth-strap," which is designed to pass under the girth of the animal to prevent it from throwing itself.

In order to cause the animal to travel in a circle and prevent it from moving laterally away from the beam 20, there is a stay-strap 33 provided, one end of which is connected with the girth-strap and the other end with the beam, as clearly shown.

From the foregoing description it will be seen that an animal will be forced to travel in a circle either backward or forward, and by the provision of the rump-strap it will be positively prevented from kicking, and thus injuring the trainer, that by the provision of the girth-strap will be positively prevented from throwing itself, and by the provision of the stay-strap it will be positively prevented from moving laterally, which would tend to break the thills.

I claim—

1. An apparatus of the class described comprising a rotatable boom, a girth-strap supported thereby, a stay-strap connected with the girth-strap, a pair of thills, and a rump-strap combined with the thills.

2. An apparatus of the class described comprising a mast, a boom combined for rotatable movement therewith, a girth-strap supported by the boom, a stay-strap connected with the girth-strap, a pair of thills, and a rump-strap combined with the thills.

3. An apparatus of the class described embodying a mast, radially-disposed sweeps rotatable about the mast, a beam connecting the sweeps, a boom supported by the beam, and a girth-strap suspended from the boom.

4. An apparatus of the class described comprising a mast, radial sweeps mounted for rotation relatively thereto, wheels carried by the outer ends of the sweeps, a beam connecting the sweeps, a boom supported by the beam, and a girth-strap suspended from the boom.

5. An apparatus of the class described comprising radial sweeps, wheels carried by the outer terminals thereof, a beam connecting the sweeps, a boom supported by the beam, a girth-strap suspended from the boom, thills combined with one of the sweeps, and a rump-strap carried by the thills.

6. An apparatus of the class described embodying a mast, a table rigid therewith, a second table rotatable upon the first-named table, radially-disposed sweeps secured to the second-named table, and means carried by the sweeps for supporting the animal therebetween.

7. An apparatus of the class described embodying a mast, radially-disposed sweeps rotatable about the mast, a beam connecting the sweeps, a boom supported by the beam, a girth-strap suspended from the boom, and a stay-strap connected with the girth-strap and with the beam.

In testimony that I claim the foregoing as my own I have hereto affixed my signature in the presence of two witnesses.

LOREN HOOVER.

Witnesses:
E. W. WAGENER,
W. A. LOWELL.